(12) United States Patent
Peters et al.

(10) Patent No.: US 7,668,303 B2
(45) Date of Patent: Feb. 23, 2010

(54) CALL TRACKING USING SIP PRESENCE MECHANISM

(75) Inventors: Michael Peters, Downers Grove, IL (US); Mike Hollatz, Huntley, IL (US); Jeffrey Hodson, Wheaton, IL (US); Joseph Steinlicht, Glen Ellyn, IL (US)

(73) Assignee: Aspect Software, Inc., Lombard, IL (US)

( * ) Notice: Subject to any disclaimer, the term of this patent is extended or adjusted under 35 U.S.C. 154(b) by 913 days.

(21) Appl. No.: 10/930,999

(22) Filed: Aug. 31, 2004

(65) Prior Publication Data

US 2006/0045255 A1 Mar. 2, 2006

(51) Int. Cl.
*H04M 3/42* (2006.01)
(52) U.S. Cl. ............ 379/201.01; 709/227; 379/265.02; 370/259
(58) Field of Classification Search ............ 379/201.01, 379/265.02; 709/227; 370/259
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,366,577 B1 | 4/2002 | Donovan | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,732,156 B2 | 5/2004 | Miloslavsky | |
| 7,257,218 B2 * | 8/2007 | Yoakum ............... | 379/265.01 |
| 2003/0021264 A1 | 1/2003 | Zhakov et al. | |

(Continued)

FOREIGN PATENT DOCUMENTS

GB 2 413 238 10/2005

(Continued)

*Primary Examiner*—Quynh H Nguyen
(74) *Attorney, Agent, or Firm*—Husch Blackwell Sanders Welsh & Katz

(57) ABSTRACT

A method and apparatus are provided for processing a call within an automatic contact distributor between a caller of the call and the automatic contact distributor. The method includes the steps of assigning a call identifier to the call when it arrives at the automatic contact distributor and transferring a call registration message from a resource of the automatic contact distributor to a tracking server of the automatic call distributor to register a presence of the call at the resource using the assigned call identifier.

34 Claims, 2 Drawing Sheets

U.S. PATENT DOCUMENTS

| | | |
|---|---|---|
| 2003/0072330 A1 | 4/2003 | Yang et al. |
| 2003/0108000 A1 | 6/2003 | Chaney et al. |
| 2003/0120813 A1 | 6/2003 | Majumdar et al. |
| 2004/0059781 A1* | 3/2004 | Yoakum et al. ............. 709/204 |
| 2004/0133641 A1* | 7/2004 | McKinnon et al. .......... 709/204 |
| 2005/0163304 A1 | 7/2005 | Judkins et al. |
| 2005/0193071 A1 | 9/2005 | Hollatz et al. |

FOREIGN PATENT DOCUMENTS

| | | |
|---|---|---|
| WO | WO 98/38780 | 9/1998 |

* cited by examiner

CALL TRACKING USING SIP PRESENCE MECHANISM

FIELD OF THE INVENTION

The field of the invention relates to communication systems and more particularly to automatic contact distributors.

BACKGROUND OF THE INVENTION

The use of contact centers by organizations for call delivery to its agents is generally known. Contact centers are generally understood to have evolved from call centers. A call center is a call processing system that processes calls through a public switched telephone network (PSTN). The term "contact center" is generally understood to involve calls arriving through the PSTN and also through other communication mediums (e.g., the Internet).

Contact centers are differentiated from telephone and Internet message delivery systems in general by the contact center's ability to automatically deliver calls to any one of a number of agents of the organization based upon some algorithm used by the contact center. Features such as DNIS and ANI within the PSTN may be used to determine an intended call target and an identity of the caller. Similar features may be used with regard to messages sent through the Internet.

By knowing the call target of the caller, the contact center may select an agent who is best suited to handle the subject matter of the call. Further, by knowing an identity of the caller, a host attached to the contact center may retrieve customer records that may be displayed on a terminal of the agent at the instant the call is delivered to the agent.

While contact centers have been effective in advancing the interest of the contact center user, the structure of prior art automatic call distributors has not lend itself to multimedia calls. Often the supporting services of the contact center, by necessity, had to integrated into a local area network. Because of the importance of automatic contact distributors, a need exists for a method of handling and tracking calls entirely through the Internet.

SUMMARY

A method and apparatus are provided for processing a call within an automatic contact distributor between a caller of the call and the automatic contact distributor. The method includes the steps of assigning a call identifier to the call when it arrives at the automatic contact distributor and transferring a call registration message from a resource of the automatic contact distributor to a tracking server of the automatic call distributor to register a presence of the call at the resource using the assigned call identifier.

DETAILED DESCRIPTION OF AN ILLUSTRATED EMBODIMENT

Figure 1:
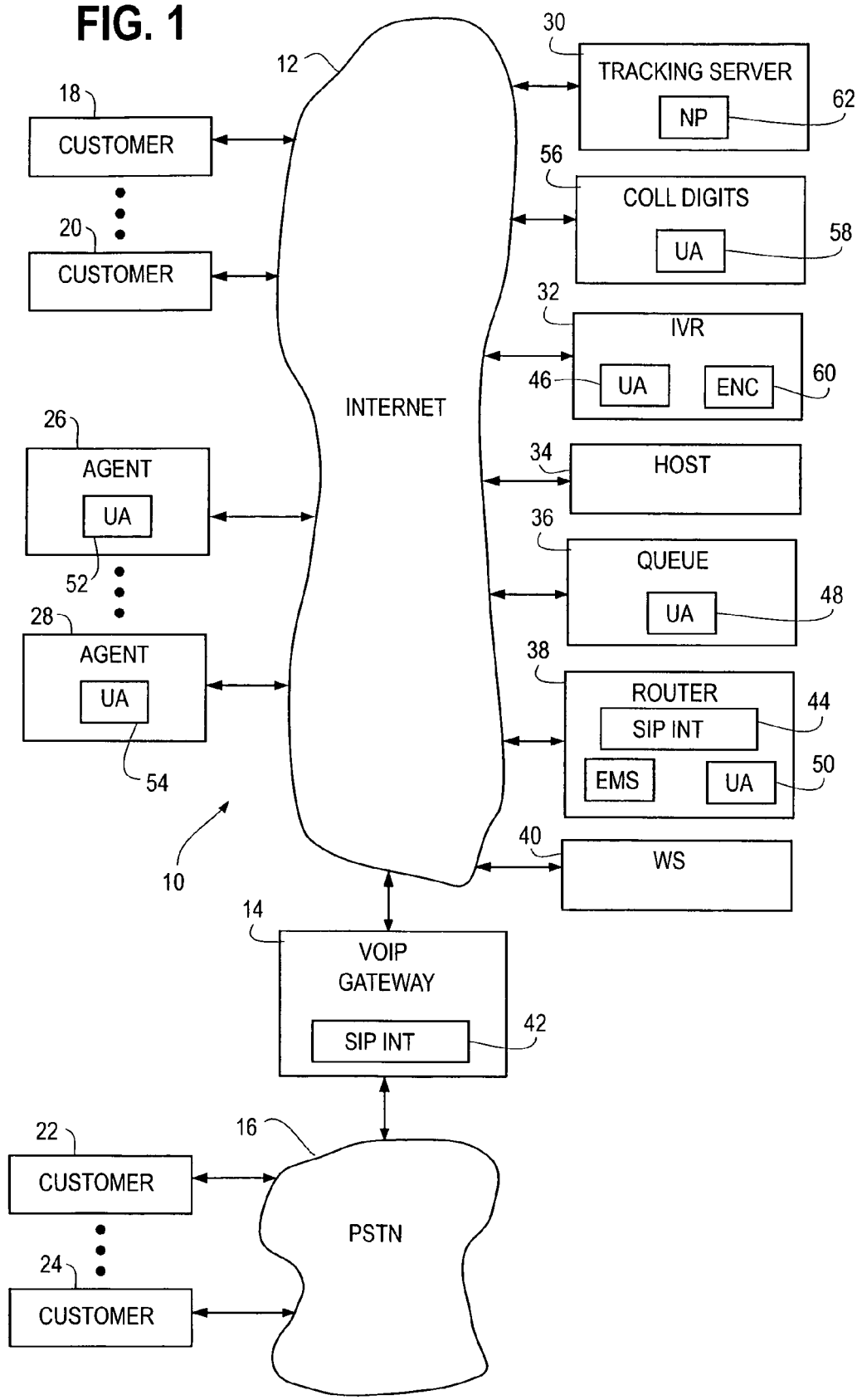
FIG. 1 depicts an automatic contact distributor in accordance with an illustrated embodiment of the invention.

FIG. 1 depicts an automatic contact distribution (ACD) system 10, shown in a context of use, generally in accordance with an illustrated embodiment of the invention. Under the illustrated embodiment, the system 10 handles multimedia calls (e.g., switched circuit calls, e-mail calls, instant messaging calls, etc.) through the Internet. The functionality of servicing calls within the system 10 is provided by a number of resource servers whose only connection may be through the Internet.

In order to track calls within the system 10, a tracking server is provided that tracks each call. As used herein, tracking a call means sequentially collecting at least an identifier of each application that serves a call during a call session. As each call is tracked, tracking information is collected from each server that services the call and saved in the tracking server. Tracking information that may be collected and saved in the tracking server may include a call identifier, an identifier of the server handling the call, the service provided by the server, the time of the service and information about the call collected from the caller or generated by the server handling the call.

The mechanism that sends the tracking information to the tracking server may be an object oriented program that is incorporated into and transferred along with packets associated with the call. Alternatively, an application that sends the tracking information to the tracking server may be included within the call handling routines available within each server.

The ACD system 10 may be used by any of a number of organizations (e.g., commercial, political, environmental etc.) to promulgate the agenda of the organization through the organization's clients. For example, under a first illustrated embodiment, the organization may be a commercial organization (e.g., a merchant) that places and receives telephone calls regarding existing or potential customers 22, 24. The merchant may place local advertisements (e.g., newspaper, television ads, etc.) for the merchant's products that include a telephone number that a customer 22, 24 may use to call the organization to inquire about or place orders for products. Alternately, the organization may purchase lists of consumer information including name, buying habits and the telephone number of potential customers. The organization may use the lists to place calls to those customers.

To handle switched circuit calls flowing in either direction, a local gateway 14 of the system 10 may be provided to allow local access to customers 22, 24 through the PSTN 16 and to avoid toll charges. The gateway 14 may function as an interface between the switched circuit environment of the PSTN 16 and packet environment of the Internet 12. A Voice-over-Internet Protocol (VoIP) software application may be provided within the gateway 14 and be assigned to each call to allow for the two-way exchange of audio information between the ACD 10 and customers 22, 24.

Included within the gateway 14 may be a Session Initated Protocol (SIP) interface (user agent) 42 (as defined by Internet Engineering Task Force (IETF) RFC #3261). A similar SIP interface (user agent) 44 may exist within a router 38.

When a call is placed by a customer 22, 24 to the ACD 10, the call is routed through the PSTN 16 to the gateway 14. Within the gateway 14, call associated information (e.g., Dialed Number Identification Service (DNIS) information, Automatic Number Identification (ANI) information, etc.) may be collected by the gateway 14. A VoIP application may also be assigned to the call to complete the connection and to exchange voice information with resources of the ACD system 10 through the Internet 12.

A controller (not shown) within the gateway 14 may compose a SIP INVITE (as defined by IETF RFC #3261) and send the INVITE to the interface 44 within the router 38. The call associated information may be incorporated into the INVITE as follows.

INVITE sip: Rtr@contactcenter.com SIP/2.0
From: Gateway@contactcenter.com
   Contact: DNIS=12345678910
   Contact: ANI=12345678910
Contact-Length=0.

The router 38 (acting as a SIP Proxy as defined by IETF RFC 3261) may assign a call identifier to the call and route the call to a resource of the ACD system 10 (e.g., an agent 26, 28, an IVR 32, queue 36, etc.). The router 38 may also compose and send a tracking message to the tracking server 30. The tracking message may have the form that follows.

REGISTER sip: registrar@contactcenter.com SIP/2.0
From: Rtr@contactcenter.com
  Contact: CallID=1234
  Contact: Time=X:YY
Contact-Length=0.

The first contact header "CallID=1234" may be used to transfer a call identifier to the tracking server. The second header "Time=X:YY" may be used to transfer a time of call arrival to the tracking server.

In this regard, the functionality of the tracking (presence) server 30 may be provided by software that provides the presence service defined by IETF RFC #3261. The tracking message (SIP REGISTER message) composed by the IVR server 32 may be in the form of a third-party presence registration message (also as defined by IETF RFC #3261) using the call identifier assigned by the router 38.

Selection of an agent 26, 28 by the router 38 may be based upon any appropriate method (e.g., idle time, skill, etc.). Where agent selection is based upon skill, the call associated information may be used to determine a call type based upon the subject matter of the call (e.g., as determined by DNIS information) or upon the identity of the caller (e.g., as determined by ANI information).

Outbound calls may be handled in a similar manner. However, instead of using DNIS and ANI information, customer information may be provided by a host 34.

In order to increase the efficiency of agents 26, 28, the router 38 may first connect calls to a preliminary resource, such as an Interactive Voice Response (IVR) unit provided by an IVR server 32. Connection of a call to the IVR server 32 may mean transferring the call identifier and an identification of a code plug within the gateway 14 that is servicing the call to the IVR server 32. Upon identification of the code plug within the gateway 14, the IVR server 32 may begin exchanging audible information with the caller 22, 24 using VoIP.

Within the IVR server 32, an audible message may be played for the benefit of the customer 22, 24 that offers choices to the customer 22, 24 and solicits responses. The VoIP application assigned to the call allows the customer 22, 24 to hear information (i.e., spoken instructions) from the IVR server 32 and to respond as appropriate.

As the call from the customer 22, 24 arrives at the IVR server 32, a user agent 46 within the IVR server sends a tracking message to the tracking server 30.

In order to protect the information of the organization using the ACD system 10, SIP REGISTER messages from resource servers to the tracking server 30 may be encrypted. Similarly, messages from the tracking server 30 to the IVR server 32 may also be encrypted.

At the IVR 32, a series of options may be presented to the caller 22, 24. The caller 22, 24 may respond to an option by voice or by entering digits through a keypad on his touch-tone telephone. The IVR 32 may be provided with voice or tone recognition software to recognize and process the responses from the caller 22, 24.

In response to detection of a response from the caller 22, 24, a third party SIP PRESENCE message may be composed within an encoder 60. The IVR 32 may send the SIP REGISTER message to the tracking server 30 with the recognized responses incorporated into the message using additional contact headers. Within the tracking server 30, the SIP REGISTER messages may be saved based upon the call ID assigned by the router 38.

In order to access and use the presence information saved within the tracking server 30, the router 38 may rely upon the SUBSCRIBE and NOTIFY functions defined by IETF RFC #3261. As each call arrives at the router 38, the router 39 may send a SUBSCRIBE message to the tracking server 30 using the call ID assigned by the router 38.

The SUBSCRIBE message identifies the call (based upon the call identifier assigned by the router 38) for which the router 38 is requesting information. The SUBSCRIBE message defines the type of presence message for which the router 38 is to be notified. In this case, the NOTIFY message would request that any presence message be forwarded to the router 38. A notification processor 62 would recover any received SIP REGISTER messages identified by the SUBSCRIBE message and forward them to the router 38.

As an alternative to registering for any presence information, the router 38 may simply request periodic updates using the call ID assigned by the router 38. In this case, the router 38 may periodically send a message requesting the content of any presence message received by the tracking server regarding the call.

Once the router 38 receives the presence message from the IVR 32 with any information entered by the caller 22, 24, the router 38 may subsequently instruct the IVR 32 to route the call to an agent 26, 28. In this case, however, the routing decision may be enhanced by the information entered by the caller 22, 24.

Once transferred to an agent 26, 28, a presence encoder within the terminal of the agent (acting as an agent server) may also send third party SIP REGISTER messages to the tracking server 30. The tracking messages encoded by the presence encoder may be sent by the user agent 52, 54 and may include an identifier of the agent, the call identifier and the time.

Further, at the termination of the call, the user agent 52, 54 may send a presence message with a termination indicator appended to the presence message. The termination indicator allows the router 38 to detect termination of the call and the availability of the agent 26, 28 for another call.

If an agent 26, 28 had not been available following routing of the call to the IVR server 32, then the router 38 may route the call to a call queue 36. In addition to routing the call, the router 38 may also instruct the queue 36 to present a particular type of audio information (e.g., music, estimated time until an agent becomes available, etc.) to the caller while the caller is on hold.

As the call arrives at the queue 36, a user agent 48 within the queue 36 may send an initial SIP PRESENCE message to the tracking server 30 with a time stamp. The queue 36 may also periodically send additional SIP REGISTER messages to the tracking server 30. If the queue 36 should detect that the customer 22, 24 has hung up, then the queue 36 may send a SIP REGISTER message with a call termination indicator.

The SIP REGISTER messages from the queue 36 function as a reminder to the router 38 that the call is on hold. The router 38 may simply rely upon the time stamp appended to each SIP REGISTER message returned under a NOTIFY command to detect a total time that the call has been in the queue 36 or the router 36 may use an internal timer to determine the length of time that the call has been in the queue 36.

If the time that a call spends in the queuing server 36 should exceed some predetermined time threshold level, then the router 38 may give the call some increased priority level. Based upon the increased priority, the router 38 may assign the call to an agent 26, 28.

By using the tracking server 30, the router 38 is able to track the progress and disposition of calls. As information is collected from a caller and transferred to the router 38, the information may be added to a call record that is created for each call. Upon selection of an agent, the corresponding call record may be transferred to the agent 26, 28.

By assigning a VoIP application to each call, the ACD system 10 may connect a caller 22, 24 to an agent 26, 28 who is local to the caller 22, 24. In this regard, toll charges to the organization using the ACD system 10 may be reduced by providing gateways 14 near customers.

Under another illustrated embodiment, customers 18, 20 may also access the ACD system 10 directly through the Internet 12. In this case, contact may be through the use of an Internet enabled telephone 18, 20. Except for use of the gateway 14, a call from a customer 18, 20 to the router 38 may be processed substantially as discussed above.

Alternatively, an initial contact may be through a website 40 of the ACD system 10. As above, each time the customer 18, 20 requests a web page, the server 40 may send a SIP REGISTER message to the tracking server 30. The SIP REGISTER messages may include an identifier of web pages visited by the customer 18, 20.

The request for information from the website 40, in turn, may cause the router 38 to open a call record and assign a call identifier to the call. The SIP REGISTER messages may be added to the call record as they are received for later reference.

One or more of the web pages visited by the customer 18, 20 may include a PLACE ORDER, a SPEAK WITH AGENT or an instant messaging softkey. If the customer 18, 20 should activate the softkey, then the router 38 may take steps to connect the customer 18, 20 to the appropriate server.

If the softkey is a PLACE ORDER softkey, then the router 38 may send the call to a collect digits server 56. The collect digits server 56 may download an interactive window asking for credit card information. As above, detection of the call by the collect digits server 56 may cause the server 56 to send a SIP REGISTER message to the tracking server 30. Once the customer 18, 20 has entered the requested information, then the collect digits server 56 may send a SIP REGISTER message to the tracking server 30 with the requested information. Upon receiving the collected information, the router 38 may enter the collected information into the call record for the call.

If the customer 18, 20 should not enter the requested information or should require further assistance, then the router 38 may route the call to an agent 26, 28. Tracking may continue as described above.

Figure 2:
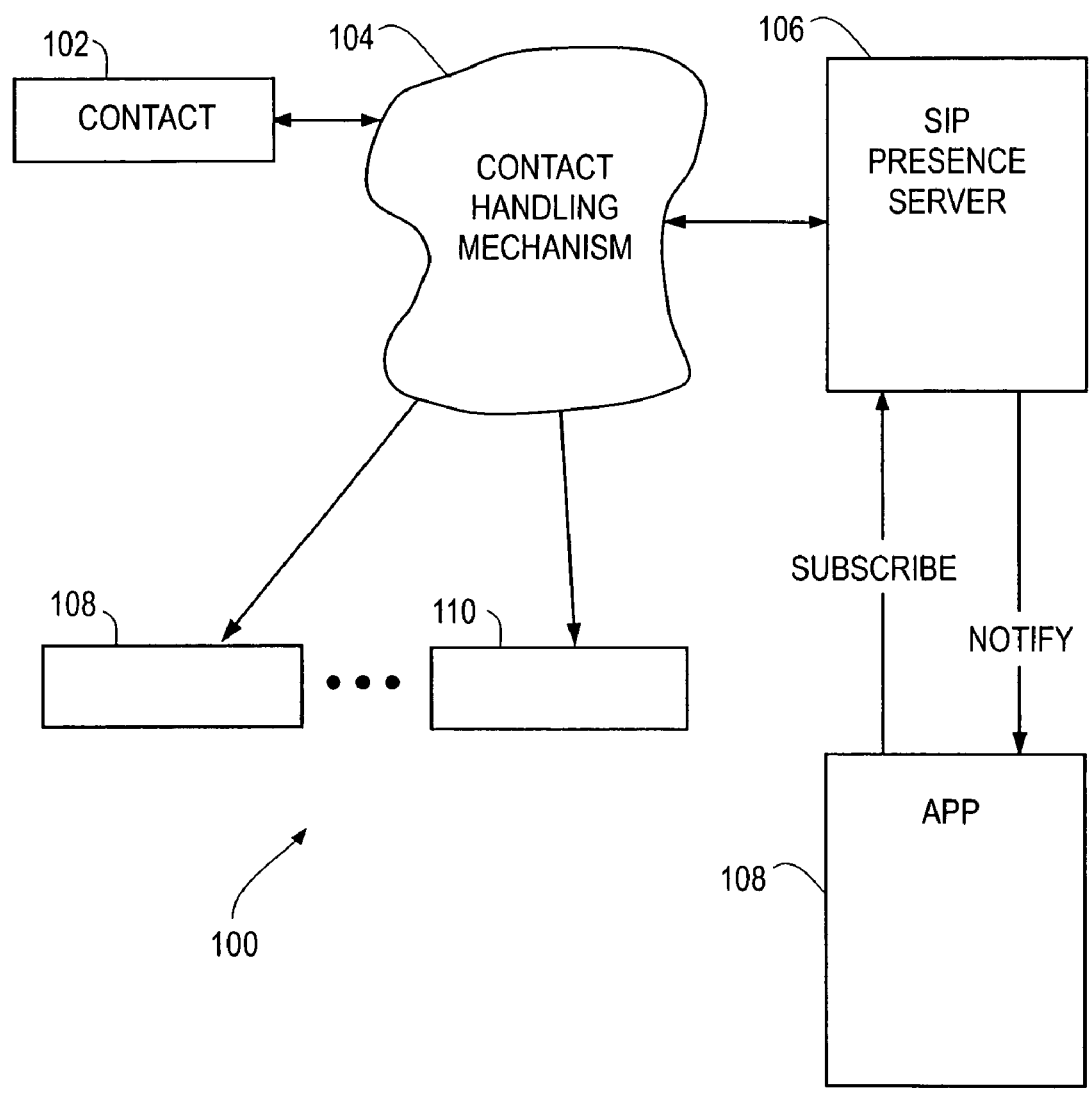
FIG. 2 depicts a communication system in accordance with an illustrated embodiment of the invention.

In another illustrated embodiment, the tracking mechanism may be extended to any communication system 100 (FIG. 2). In this case, the contact handling mechanism 104 may receive a call from a caller 102 and transfer the call to any of a number of resources 108, 110. In this case, the contact handling mechanism 104 may be any communication system (e.g., ACD, PBX, TELCO switch, e-mail center, Instant Messaging (IM) center, etc.).

Each resource 108, 110 may send a tracking message to a tracking server 106. Remote applications 108 may retrieve and track calls for any appropriate purpose.

In the above described situation, the use of SIP for tracking a call differs from the prior art in a reversal of perspective. For example, in the prior art, the SIP presentity mechanism was used to track a human subscriber. In the situation described herein, the presence server 30, 106 is used to track the call.

A specific embodiment of a method and apparatus for controlling calls using a SIP presence mechanism has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing a call within an automatic contact distributor between a caller of the call and the automatic contact distributor, such method comprising the steps of:

assigning a call identifier to the call when it arrives at the automatic contact distributor and defining the call as a Session Initiation Protocol (SIP) presentity; and transferring a SIP REGISTER message for the call including the assigned call identifier from a resource of the automatic contact distributor to a tracking server of the automatic contact distributor when the call arrives at the resource to register at the tracking server the SIP presentity of the call at the resource using the assigned call identifier and transferring at least one further SIP REGISTER message identified with the call using the call identifier to the tracking server upon the occurrence of a predetermined call related event, and appending information associated with the predetermined event and an identifier of an application that services the call to the further SIP REGISTER message to permit tracking progress of the call.

2. The method of processing the call as in claim 1 further comprising the tracking server sequentially collecting the identifier of each application that services the call during a call session.

3. The method of processing the call as in claim 1 further comprising periodically sending a message requesting content of any presence message received by the tracking server regarding the call.

4. The method of processing the call as in claim 3 further comprising routing the call to a queue and periodically transferring register messages to the tracking server while the call is in the queue.

5. The method of processing the call as in claim 4 wherein the predetermined event further comprises detection of information provided by a caller of the call.

6. The method of processing the call as in claim 4 wherein the predetermined event further comprises termination of the call.

7. The method of processing the call as in claim 4 wherein the predetermined event further comprises passage of a predetermined time period.

8. The method of processing the call as in claim 4 further comprising using the tracking server to track progress and disposition of the call.

9. The method of processing the call as in claim 1 further comprising transferring the registration message from the tracking server to a router of the automatic call distributor.

10. Apparatus for processing a call within an automatic contact distributor between a caller of the call and the automatic contact distributor, such comprising:

means for assigning a call identifier to the call when it arrives at the automatic contact distributor and means for defining a tracking server as a Session Initiation Protocol presentity;

means for transferring a call registration message including the assigned call identifier from a resource of the automatic contact distributor to the tracking server of the automatic contact distributor to register to the tracking server a presence of the call at the resource when the call arrives at the resource using the assigned call identifier; and means for transferring a further registration message for the call to the tracking server upon occurrence of a predetermined call related event, and for appending at least one descriptor of the predetermined call related event and an identifier of an application that services the call to the further registration message to permit tracking progress of the call.

11. The apparatus for processing the call as in claim 10 further comprising means for periodically sending a message requesting content of any presence message received by the tracking server regarding the call.

12. The apparatus for processing the call as in claim 10 further comprising means for routing the call to a queue and periodically transferring register messages to the tracking server while the call is in the queue.

13. The apparatus for processing the call as in claim 10 wherein the predetermined event further comprises detection of information provided by a caller of the call.

14. The apparatus for processing the call as in claim 10 wherein the predetermined event further comprises termination of the call.

15. The apparatus for processing the call as in claim 10 wherein the predetermined event further comprises passage of a predetermined time period.

16. The apparatus for processing the call as in claim 10 further comprising means for using the tracking server to track progress and disposition of the call.

17. The apparatus for processing the call as in claim 10 further comprising means for transferring the registration message from the tracking server to a router of the automatic call distributor.

18. Apparatus for processing a call within an automatic contact distributor between a caller of the call and the automatic contact distributor, such comprising:
a router of the automatic contact distributor configured to assign a call identifier to the call when it arrives at the automatic contact distributor;
a tracking server of the automatic contact distributor defined as a Session Initiation Protocol presentity configured to receive a call registration message including the assigned call identifier from a resource of the automatic contact distributor to register at the tracking server a presence of the call at the resource using the assigned call identifier including a user agent configured to transfer the registration message to the tracking server when the call arrives at the resource; and
a resource server configured to transfer a call registration message for the call to the tracking server upon occurrence of a predetermined call related event, and an encoder configured to append a descriptor of the predetermined call related event, and an identifier of an application that services the call to the call registration message to permit tracking progress of the call.

19. The apparatus for processing the call as in claim 18 further comprising the tracking server sequentially collecting the identifier of each application that services the call during a call session.

20. The apparatus for processing the call as in claim 18 further comprising a module adapted to periodically send a message requesting content of any presence message received by the tracking server regarding the call.

21. The apparatus for processing the call as in claim 18 further comprising a server adapted to route the call to a queue and periodically transfer register messages to the tracking server while the call is in the queue.

22. The apparatus for processing the call as in claim 21 wherein the predetermined event further comprises detection of information provided by a caller of the call.

23. The apparatus for processing the call as in claim 21 wherein the predetermined event further comprises termination of the call.

24. The apparatus for processing the call as in claim 21 wherein the predetermined event further comprises passage of a predetermined time period.

25. The apparatus for processing the call as in claim 18 further comprising a module configured to use the tracking server to track progress and disposition of the call.

26. The apparatus for processing the call as in claim 18 further comprising a notification processor configured to transfer the registration message from the tracking server to a router of the automatic call distributor.

27. A method of processing a call within a communication system between a caller of the call and a plurality of resources of the communication system, such method comprising the steps of:
assigning a call identifier to the call when it arrives at the communication system
and defining the call as a Session Initiation Protocol presentity; and
transferring a call registration message for the call including the assigned call identifier from a resource of the plurality of resources of the communication server to a presentity server of the communication system to register with the presentity server the presentity of the call at the resource using the assigned call identifier, and transferring a further call registration message for the call to the presentity server upon occurrence of a predetermined call related event and appending an identifier of an application that services the call to the further call registration message and appending at least one descriptor of the predetermined call related event to the further call registration message.

28. The method of processing the call as in claim 27 further comprising transferring the registration message to the presence server when the call first arrives at the resource.

29. The method processing the call as in claim 28 further comprising transferring a further registration to the presence server upon the occurrence of a predetermined event.

30. The method of processing the call as in claim 29 wherein the predetermined event further comprises detection of information provided by a caller of the call.

31. The method of processing the call as in claim 29 wherein the predetermined event further comprises termination of the call.

32. The method of processing the call as in claim 29 wherein the predetermined event further comprises passage of a predetermined time period.

33. The method of processing the call as in claim 29 further comprising routing the call to a queue and periodically transferring register messages to the presentity server while the call is in the queue.

34. The method of processing the call as in claim 27 further comprising transferring the registration message from the tracking server to a router of the automatic call distributor.

* * * * *

UNITED STATES PATENT AND TRADEMARK OFFICE
CERTIFICATE OF CORRECTION

PATENT NO. : 7,668,303 B2
APPLICATION NO. : 10/930999
DATED : February 23, 2010
INVENTOR(S) : Peters et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1514 days.

Signed and Sealed this

Seventh Day of December, 2010

David J. Kappos
*Director of the United States Patent and Trademark Office*